(12) United States Patent
Okazaki et al.

(10) Patent No.: US 8,853,346 B2
(45) Date of Patent: Oct. 7, 2014

(54) CURABLE RESIN COMPOSITION

(75) Inventors: Hitoshi Okazaki, Chiba (JP); Motoharu Takeuchi, Ibaraki (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 13/580,803

(22) PCT Filed: Feb. 8, 2011

(86) PCT No.: PCT/JP2011/000702
§ 371 (c)(1),
(2), (4) Date: Oct. 5, 2012

(87) PCT Pub. No.: WO2011/105014
PCT Pub. Date: Sep. 1, 2011

(65) Prior Publication Data
US 2013/0018168 A1    Jan. 17, 2013

(30) Foreign Application Priority Data

Feb. 24, 2010    (JP) .................................. 2010-038674

(51) Int. Cl.
*C08G 75/04* (2006.01)
*C08L 81/02* (2006.01)
*C08G 75/08* (2006.01)

(52) U.S. Cl.
CPC ...................................... *C08G 75/08* (2013.01);
*C08L 81/02* (2013.01)
USPC ............ 528/374; 528/370; 528/373; 528/378

(58) Field of Classification Search
USPC .................. 528/374, 370, 373, 378
See application file for complete search history.

(56) References Cited

U.S. PATENT DOCUMENTS

| | | | |
|---|---|---|---|
| 5,807,975 A | 9/1998 | Amagai et al. | |
| 5,945,504 A | 8/1999 | Amagi et al. | |
| 6,534,589 B1 | 3/2003 | Yoshimura et al. | |
| 8,575,293 B2 | 11/2013 | Horikoshi et al. | |
| 2007/0149482 A1 | 6/2007 | Bradaric-Baus et al. | |
| 2009/0030158 A1 | 1/2009 | Amano et al. | |
| 2009/0118442 A1 | 5/2009 | Tsunashima et al. | |
| 2009/0253914 A1 | 10/2009 | Ignatyev et al. | |
| 2010/0331515 A1 | 12/2010 | Takeuchi et al. | |
| 2011/0130516 A1* | 6/2011 | Murakami et al. ............ | 524/857 |

FOREIGN PATENT DOCUMENTS

| | | |
|---|---|---|
| JP | 9-71580 | 3/1997 |
| JP | 9-110979 | 4/1997 |
| JP | 9-255781 | 9/1997 |
| JP | 2000-239384 | 9/2000 |
| JP | 2001-163874 | 6/2001 |
| JP | 2007-284525 | 11/2007 |
| JP | 2008-523120 | 7/2008 |
| TW | 200821348 | 5/2008 |
| WO | 2004/094438 | 11/2004 |
| WO | 2007/119809 | 10/2007 |
| WO | 2009/014270 | 1/2009 |

OTHER PUBLICATIONS

Office Action in application No. 201180010569.0 dated Oct. 23, 2013 along with an english translation thereof.
U.S. Appl. No. 13/577,298 to Mineki Kubo et al., filed Aug. 6, 2012, Dec. 6, 2012.
Search report from International Patent Application No. PCT/JP2011/000702, mail date is May 24, 2011.
Taiwanese Office Action with English Translation in respect to Taiwanese Application No. 100106229, dated Jun. 19, 2014.

* cited by examiner

*Primary Examiner* — Shane Fang
(74) *Attorney, Agent, or Firm* — Greenblum & Bernstein, P.L.C.

(57) ABSTRACT

The invention relates to a curable composition preferable as a raw material for optical materials such as adhesive agents for optical elements, coating agents for optical elements, resist materials, prisms, optical fibers, information recording substrates, filters and plastic lenses, and more specifically to a curable composition characterized by containing (A) an episulfide compound, and (B) a polymerization catalyst comprising a tetraalkylphosphonium dialkylphosphate represented by the following general formula (1):

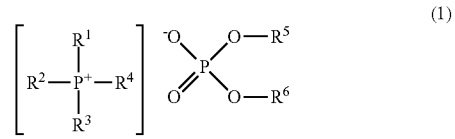

(1)

wherein $R^1$ to $R^6$ are the same or different, an alkyl group having 1 to 8 carbon atoms or an alkyl group having a hydroxyl group and 1 to 8 carbon atoms, and linear, branched or cycloaliphatic.

6 Claims, No Drawings

CURABLE RESIN COMPOSITION

TECHNICAL FIELD

This invention relates to a curable composition preferable as a raw material for optical materials such as adhesive agents for optical elements, coating agents for optical elements, resist materials, prisms, optical fibers, information recording substrates, filters and plastic lenses.

BACKGROUND ART

One of the optical performances required for many optical materials made of plastic is a refractive index. Particularly for an optical material with a high refractive index, many episulfide compounds capable of providing an optical material with a refractive index of not less than 1.7 have been discovered (Patent Documents 1 to 4).

As a polymerization catalyst for a composition containing an episulfide compound, onium salts such as quaternary ammonium salts, quaternary phosphonium salts, tertiary sulfonium salts and secondary iodonium salts, which have a halogen in an anionic part, have been disclosed (Patent Document 5). However, in recent years, from a perspective of environmental load reduction, a halogen-free material has been desired.

On the other hand, as a curing accelerator for an epoxy resin, tetraalkylphosphonium dialkylphosphates have been disclosed (Patent Document 6). However, it has not been described that these can be used as a polymerization catalyst for an episulfide compound.

PRIOR ART DOCUMENTS

Patent Documents

Patent Document 1: JP-A-H9-71580
Patent Document 2: JP-A-H9-110979
Patent Document 3: JP-A-H9-255781
Patent Document 4: JP-A-2001-163874
Patent Document 5: JP-A-2000-239384
Patent Document 6: JP-A-2007-284525

SUMMARY OF THE INVENTION

Problem to be Solved by the Invention

It is an object of the invention to provide a curable composition containing an episulfide compound, capable of producing a resin with a high refractive index, which has good transparency and color tone but contains no halogen.

Means for Solving the Problem

The inventors have, as a result of devoted examinations to solve the above problem, discovered that a particular tetraalkylphosphonium dialkylphosphate, which contains no halogen atom in its molecular structure, has appropriate catalyst activity to an episulfide compound and is difficult to be yellowed and deteriorated by heat or light, is preferred as a polymerization catalyst for an episulfide compound, and reached the invention.

More specifically, the invention relates to a curable composition characterized by containing (A) an episulfide compound, and (B) a polymerization catalyst comprising a tetraalkylphosphonium dialkylphosphate represented by the following general formula (1).

[Chem. 1]

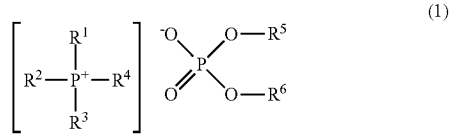

(In the formula, $R^1$ to $R^6$ are the same or different, an alkyl group having 1 to 8 carbon atoms or an alkyl group having a hydroxyl group and 1 to 8 carbon atoms, and linear, branched or cycloaliphatic.)

Effect of the Invention

According to the invention, it is possible to provide a curable composition containing an episulfide compound, which is easily polymerizable by heating, and a resin with a high refractive index having excellent transparency and color tone but containing no halogen by polymerizing the curable composition.

BEST MODE FOR CARRYING OUT THE INVENTION (A) The episulfide compound used in the invention is a compound having one or more thiirane rings per molecule, and the thiirane ring is ring-opening polymerized to produce a cured product. Particularly when seeking improvement in a crosslinkability of the curable composition and a refractive index of the resulting cured product, a compound represented by the following general formula (2) is preferable.

[Chem. 2]

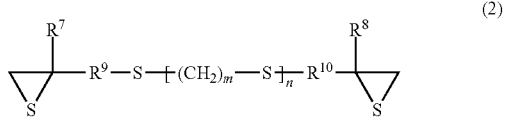

(In the formula, n is an integer of 0 to 4, m is an integer of 0 to 6, $R^7$ and $R^8$ are each independently a hydrogen atom or a hydrocarbon group having 1 to 10 carbon atoms, and $R^9$ and $R^{10}$ are each independently a hydrocarbon group having 1 to 10 carbon atoms.)

Specific examples of the compound represented by the general formula (2) include bis(2,3-epithiopropyl)sulfide, bis(2,3-epithiopropylthio)ethane, bis(2,3-epithiopropylthio)propane, bis(2,3-epithiopropylthio)butane, bis(5,6-epithio-3-thiohexane)sulfide, bis(2,3-epithiopropyl)disulfide, bis(3,4-epithiobutyl)disulfide, bis(4,5-epithiopentyl)disulfide and bis(5,6-epithiohexyl)disulfide, and bis(2,3-epithiopropyl)sulfide [in the general formula (2), n is 0, $R^7$ and $R^8$ are hydrogen atoms, and $R^9$ and $R^{10}$ are methylene groups] and bis(2,3-epithiopropyl)disulfide [in the general formula (2), m is 0, n is 1, $R^7$ and $R^8$ are hydrogen atoms, and $R^9$ and $R^{10}$ are methylene groups] are preferable, and bis(2,3-epithiopropyl)sulfide is particularly preferable.

(B) The tetraalkylphosphonium dialkylphosphate represented by the general formula (1) of the invention, which contains no halogen atom in its molecular structure, is preferred from the perspective of environmental load reduction. Also, since it shows adequate catalyst activity to an episulfide compound, it can easily polymerize an episulfide compound by adequate heating. Moreover, since it is stable against heat and light, yellowing of a cured product caused by yellowing of a polymerization catalyst can be prevented.

Furthermore, since it shows adequate catalyst activity to an episulfide compound, it has characteristics that polymerization of a curable composition hardly progresses at normal temperature, i.e., a usable time (time in which a viscosity is stable under normal temperature storage) of a curable composition is long. If the catalyst activity of a polymerization catalyst is too strong, polymerization of a curable composition gradually progresses even at normal temperature. As a result, the viscosity of a curable composition momentarily changes, and it becomes difficult to obtain a stable handling property.

It is possible to produce the tetraalkylphosphonium dialkylphosphate represented by the general formula (1) through a publicly known method. The method includes, for example, a production method through a reaction of a tetraalkylphosphonium halide and a metal dialkylphosphate salt as described in JP-A-H2-40389, a production method through a reaction of a tetraalkylphosphonium halide and a dialkylphosphoric acid as described in U.S. Pat. No. 3,050,543 B, a production method through a reaction of a tertiary phosphine and a phosphate ester as described in JP-A-2007-284525, and the like.

The tetraalkylphosphonium dialkylphosphate represented by the general formula (1) includes the following compounds.

(Dimethylphosphate Group)

Tetramethylphosphonium dimethylphosphate, tetraethylphosphonium dimethylphosphate, tetra-n-propylphosphonium dimethylphosphate, tetra-n-butylphosphonium dimethylphosphate, tetra-n-pentylphosphonium dimethylphosphate, tetra-n-hexylphosphonium dimethylphosphate, ethyltrimethylphosphonium dimethylphosphate, methyltriethylphosphonium dimethylphosphate, methyltri-n-propylphosphonium dimethylphosphate, methyltri-n-butylphosphonium dimethylphosphate, methyltri-n-pentylphosphonium dimethylphosphate, methyltri-n-hexylphosphonium dimethylphosphate, methyltricyclopentylphosphonium dimethylphosphate, methyltricyclohexylphosphonium dimethylphosphate, diethyldimethylphosphonium dimethylphosphate, di-n-propylethylmethylphosphonium dimethylphosphate, di-n-butylethyl-n-propylphosphonium dimethylphosphate (Diethylphosphate Group)

Tetramethylphosphonium diethylphosphate, tetraethylphosphonium diethylphosphate, tetra-n-propylphosphonium diethylphosphate, tetra-n-butylphosphonium diethylphosphate, tetra-n-pentylphosphonium diethylphosphate, tetra-n-hexylphosphonium diethylphosphate (Di-n-propylphosphate Group)

Tetramethylphosphonium di-n-propylphosphate, tetraethylphosphonium di-n-propylphosphate, tetra-n-propylphosphonium di-n-propylphosphate, tetra-n-butylphosphonium di-n-propylphosphate, tetra-n-pentylphosphonium di-n-propylphosphate, tetra-n-hexylphosphonium di-n-propylphosphate (Di-n-butylphosphate Group)

Tetramethylphosphonium di-n-butylphosphate, tetraethylphosphonium di-n-butylphosphate, tetra-n-propylphosphonium di-n-butylphosphate, tetra-n-butylphosphonium di-n-butylphosphate, tetra-n-pentylphosphonium di-n-butylphosphate, tetra-n-hexylphosphonium di-n-butylphosphate, methyltri-n-butylphosphonium di-n-butylphosphate, ethyltri-n-butylphosphonium di-n-butylphosphate, n-propyltri-n-butylphosphonium di-n-butylphosphate, n-pentyltri-n-butylphosphonium di-n-butylphosphate, n-hexyltri-n-butylphosphonium di-n-butylphosphate, methyltriethylphosphonium di-n-butylphosphate, methyltri-n-propylphosphonium di-n-butylphosphate, methyltri-n-pentylphosphonium di-n-butylphosphate, methyltri-n-hexylphosphonium di-n-butylphosphate, methyltricyclopentylphosphonium di-n-butylphosphate, methyltricyclohexylphosphonium di-n-butylphosphate, n-butylethylmethyl-n-propylphosphonium di-n-butylphosphate (Di-n-octylphosphate Group)

Tetramethylphosphonium di-n-octylphosphate, tetraethylphosphonium di-n-octylphosphate, tetra-n-propylphosphonium di-n-octylphosphate, tetra-n-butylphosphonium di-n-octylphosphate, tetra-n-pentylphosphonium di-n-octylphosphate, tetra-n-hexylphosphonium di-n-octylphosphate, ethyltrimethylphosphonium di-n-octylphosphate, methyltriethylphosphonium di-n-octylphosphate, methyltri-n-propylphosphonium di-n-octylphosphate, methyltri-n-butylphosphonium di-n-octylphosphate, methyltri-n-pentylphosphonium di-n-octylphosphate, methyltri-n-hexylphosphonium di-n-octylphosphate, methyltricyclopentylphosphonium di-n-octylphosphate, methyltricyclohexylphosphonium di-n-octylphosphate, diethyldimethylphosphonium di-n-octylphosphate, di-n-propylethylmethylphosphonium di-n-octylphosphate, di-n-butylethyl-n-propylphosphonium di-n-octylphosphate (Ethylmethylphosphate Group)

Methyltri-n-butylphosphonium ethylmethylphosphate, tetra-n-butylphosphonium ethylmethylphosphate, tetramethylphosphonium ethylmethylphosphate, tetraethylphosphonium ethylmethylphosphate, tetra-n-propylphosphonium ethylmethylphosphate, tetra-n-pentylphosphonium ethylmethylphosphate, tetra-n-hexylphosphonium ethylmethylphosphate (Dicyclohexylphosphate Group)

Tetramethylphosphonium dicyclohexylphosphate, tetraethylphosphonium dicyclohexylphosphate, tetra-n-propylphosphonium dicyclohexylphosphate, tetra-n-butylphosphonium dicyclohexylphosphate, tetra-n-pentylphosphonium dicyclohexylphosphate, tetra-n-hexylphosphonium dicyclohexylphosphate Among these compounds, for the point in that an absorption in the visible light region is small and, light resistance becomes good, methyltri-n-butylphosphonium dimethylphosphate, tetra-n-butylphosphonium di-n-butylphosphate, tetra-n-butylphosphonium dimethylphosphate, methyltri-n-butylphosphonium di-n-butylphosphate and tetra-n-butylphosphonium di-n-octylphosphate are preferable, and methyltri-n-butylphosphonium dimethylphosphate, tetra-n-butylphosphonium di-n-butylphosphate and tetra-n-butylphosphonium di-n-octylphosphate are particularly preferable. The above-described compounds may be used alone or in a mixture of two kinds or more.

When an additive amount of the tetraalkylphosphonium dialkylphosphate is too small, a curable composition becomes unable to be sufficiently polymerized, while when it is too large, the usable time (time in which the viscosity is stable under normal temperature storage) of a curable composition becomes short. Therefore, the additive amount of the tetraalkylphosphonium dialkylphosphate is preferably within a range of 0.001 to 5 parts by weight, more preferably 0.01 to 2 parts by weight, and even more preferably 0.05 to 0.5 part by weight based on 100 parts by weight of a total amount of (A) the episulfide compound and (C) a thiol compound to be described.

The curable composition of the invention containing (A) the episulfide compound and (B) the tetraalkylphosphonium dialkylphosphate may further contain (C) a thiol compound. Since the thiol compound is copolymerizable with the episulfide compound and has an oxidization inhibiting effect, a cured product with less yellow coloration and excellent transparency can be obtained by compounding the thiol compound. The thiol compound herein is a compound having one or more mercapto groups per molecule, but a compound having two or more mercapto groups is preferable for improving a mechanical strength of a cured product.

Preferable specific examples of the thiol compound include methanedithiol, methanetrithiol, 1,2-dimercaptoethane, bis(2-mercaptoethyl)sulfide, bis(2,3-dimercaptopropyl)sulfide, 1,2,3-trimercaptopropane, 2-mercaptomethyl-1,3-dimercaptopropane, 4-mercaptomethyl-1,8-dimercapto-3,6-dithiaoctane, 2,4-bis(mercaptomethyl)-1,5-dimercapto-3-thiapentane, 4,8-bis(mercaptomethyl)-1,11-dimercapto-3,6,9-trithiaundecane, 4,7-bis(mercaptomethyl)-1,11-dimercapto-3,6,9-trithiaundecane, 5,7-bis(mercaptomethyl)-1,11-dimercapto-3,6,9-trithiaundecane, 1,2,7-trimercapto-4,6-dithiaheptane, 1,2,9-trimercapto-4,6,8-trithianonane, 1,2,8,9-tetramercapto-4,6-dithianonane, 1,2,10,11-tetramercapto-4,6,8-trithiaundecane, 1,2,12,13-tetramercapto-4,6,8,10-tetrathiamidecane, tetrakis(mercaptomethyl)methane, tetrakis(4-mercapto-2-thiabutyl)methane, tetrakis(7-mercapto-2,5-dithiaheptyl)methane, trimethylolpropane tris(2-mercaptoacetate), trimethylolpropane tris(3-mercaptopropionate), pentaerythritol tetrakis(2-mercaptoacetate), pentaerythritol tetrakis(3-mercaptopropionate), pentaerythritol tetrakis(3-mercaptobutyrate), 2,5-bis(mercaptomethyl)-1,4-dithiane, 1,3-bis(mercaptomethyl)benzene, 1,4-bis(mercaptomethyl)benzene, bis(4-mercaptophenyl)sulfide, bis(4-mercaptomethylphenyl)methane, 2,2-bis(4-mercaptomethylphenyl)propane, bis(4-mercaptomethylphenyl)ether, bis(4-mercaptomethylphenyl) sulfide and the like. Preferable thiol compounds are illustrated above, but they may be used alone or in a mixture of two kinds or more.

Regarding a content of the thiol compound, a transparent and colorless cured product can be obtained when it is greater, but on the other hand, the refractive index of the cured product decreases and also the cured product tends to be soft. Therefore, the content of the thiol compound is preferably within a range of 0 to 50 parts by weight, more preferably 5 to 30 parts by weight, and even more preferably 10 to 25 parts by weight based on 100 parts by weight of the total amount of the episulfide compound and the thiol compound.

It is also possible to add, if required, an antioxidant, a light stabilizer (HALS), a UV absorber, a silane coupling agent, a mold release agent, an inorganic filler, a pigment, a dye, a reactive or unreactive diluent and the like to the curable composition of the invention.

The curable composition of the invention can be obtained by homogeneously mixing (A) the episulfide compound, (B) the tetraalkylphosphonium dialkylphosphate, (C) the thiol compound, and various additives if required, according to the usual manner, at room temperature of about 25° C. or under heating.

The curable composition of the invention can be polymerized by heating to obtain a cured product. The temperature and the time of heating, which depend on the kind and the compounding amount of an episulfide compound, the kind and the additive amount of a polymerization catalyst, and the like, cannot be completely defined, but the heating temperature is preferably within a range of 20° C. to 120° C., and also the heating time is preferably within a range of 30 minutes to 100 hours.

EXAMPLES

Although the invention will be specifically described below by the examples, the invention is not limited thereto. It should be noted that in the examples, (A) the episulfide compound was synthesized according to the method described in JP-A-H9-110979. (B) The tetraalkylphosphonium dialkylphosphate was synthesized according to the method described in JP-A-2007-284525, or an industrially available one was used. For (C) the thiol compound and the other compounds, industrially available ones were used.

The usable time of a curable composition was evaluated by the viscosity change of the curable composition at normal temperature. A test tube was charged with 5 g of a curable composition and kept in a water bath at 25° C., and an initial viscosity and a viscosity after 6 hours were measured. A cone/plate type viscometer DV-II+ (made by Brookfield Engineering Laboratories, Inc.) was used for the viscosity measurement, and the measurement temperature was 25° C.

A cured product was produced by the following method. First, a curable composition was injected into a mold adapted to sandwich an O-ring (G-60, Viton rubber) between two hard glasses. Subsequently, the heat was kept at 30° C. for 10 hours in an electric oven with a program function, increased from 30° C. to 100° C. at a rate of 7° C./hr over 10 hours, and finally kept at 100° C. for 1 hour. Thereafter, a cured product obtained by polymerization was removed from the mold to obtain a cured product in a flat plate shape.

A precision refractometer KPR-200 (Kalnew Optical Industrial Co., Ltd.) was used for the measurement of the refractive index of the cured product. The measurement temperature was 25° C., and the measurement wavelength was d-line (587.56 nm).

A viscoelasticity measuring instrument DMS6100 (made by Seiko Instruments Inc.) was used for the measurement of the glass transition temperature (hereinafter, abbreviated as Tg) of the cured product. The rate of temperature increase was 2° C./min, the frequency was 10 Hz, and Tg was determined as the peak temperature of tan δ.

The transparency of the cured product was evaluated with visual observation by illuminating the light of a mercury lamp to the cured product in a dark room. The thickness of the cured product was 2.5 mm.

The evaluation of the yellowing resistance of the cured product was performed by measuring the yellowness index (YI value) in the initial stage, after heating, and after exposure. The heating was conducted at 120° C. for 100 hours. The exposure was conducted by using a light resistance testing machine SUNTEST XLS+ (made by Toyo Seiki Co., Ltd., equipped with a Xe lamp and a UV filter), with an illumination intensity of 500 W/m$^2$, at a temperature of 50° C., and an exposure time of 100 hours. A spectral color meter JS555 (made by Color Techno System Corp.) was used for the measurement of the yellowness index (YI value), the thickness of the cured product was 2.5 mm, and the measurement temperature was 25° C.

Example 1

(A) Bis(2,3-epithiopropyl)sulfide (100 parts by weight) and (B) methyltri-n-butylphosphonium dimethylphosphate (0.05 part by weight) (product name PX-4 MP, made by Nippon Chemical Industrial Co., Ltd.) as a polymerization catalyst were mixed and stirred at room temperature to be a uniform liquid. This was stirred under reduced pressure for defoaming, and then filtrated with a membrane filter (PTFE, 0.5 μm) to produce a curable composition. The evaluation result of the usable time of the curable composition, and the evaluation results of the refractive index, Tg, transparency, and the yellowness index of a cured product produced by polymerizing the same are shown in Table 1.

Examples 2 to 4

Example 1 was repeated except that the kind and the compounding amount of the component (B) were changed into the content shown in Table 1. The evaluation results are shown in Table 1.

Comparative Example 1

Example 1 was repeated except that the component (B) was changed into tetra-n-butylphosphonium bromide (0.1 part by weight). The evaluation results are shown in Table 1. As compared to Example 1, the results are that the usable time of the curable composition was short and it solidified in 6 hours, and also the yellowing resistance of the cured product was poor. Moreover, since tetra-n-butylphosphonium bromide contains a halogen atom (bromine atom) in its molecular structure, it is not preferable from the perspective of environmental load reduction.

Comparative Example 2

As Example 1 was repeated except that the component (B) was changed into tetra-n-butylphosphonium O,O-diethylphosphorodithioate (0.01 part by weight), a curable composition was vigorously polymerized along with rapid heat generation during preparation. As compared to Example 1, the result was that the catalyst activity of the component (B) as a polymerization catalyst was too strong.

Example 5

(A) Bis(2,3-epithiopropyl)sulfide (90 parts by weight), (B) methyltri-n-butylphosphonium dimethylphosphate (0.1 part by weight) (product name PX-4 MP, made by Nippon Chemical Industrial Co., Ltd.) as a polymerization catalyst, and (C) bis(2-mercaptoethyl)sulfide (10 parts by weight) as a thiol compound were mixed and stirred at room temperature to be a uniform liquid. This was stirred under reduced pressure for defoaming, and then filtrated with a membrane filter (PTFE, 0.5 μm) to produce a curable composition. The evaluation results are shown in Table 2.

Comparative Example 3

Example 5 was repeated except that the component (B) was changed into tetra-n-butylphosphonium bromide (0.1 part by weight). The evaluation results are shown in Table 2. As compared to Example 5, the result was that the usable time of the curable composition was short. Moreover, since tetra-n-butylphosphonium bromide contains a halogen atom (bromine atom) in its molecular structure, it is not preferable from the perspective of environmental load reduction.

Comparative Example 4

Example 5 was repeated except that the component (B) was changed into tetra-n-butylammonium bromide (0.1 part by weight). The evaluation results are shown in Table 2. As compared to Example 5, the result was that the usable time of the curable composition was short. Moreover, since tetra-n-butylammonium bromide contains a halogen atom (bromine atom) in its molecular structure, it is not preferable from the perspective of environmental load reduction.

Comparative Example 5

Example 5 was repeated except that the component (B) was changed into diethylcyclohexylamine (0.1 part by weight). The evaluation results are shown in Table 2. As compared to Example 5, the results were that Tg of the cured product was low, and also transparency of the cured product was poor.

Example 6

(A) Bis(2,3-epithiopropyl)sulfide (75 parts by weight), (B) methyltri-n-butylphosphonium dimethylphosphate (0.5 part by weight) (product name PX-4 MP, made by Nippon Chemical Industrial Co., Ltd.) as a polymerization catalyst, and (C) pentaerythritol tetrakis(3-mercaptopropionate) (25 parts by weight) as a thiol compound were mixed and stirred at room temperature to be a uniform liquid. This was stirred under reduced pressure for defoaming, and then filtrated with a membrane filter (PTFE, 0.5 μm) to produce a curable composition. The evaluation results are shown in Table 3.

Comparative Example 6

Example 6 was repeated except that the component (B) was changed into tetra-n-butylphosphonium bromide (0.1 part by weight). The evaluation results are shown in Table 3. While the similar performances to Example 6 were obtained, tetra-n-butylphosphonium bromide contains a halogen atom (bromine atom) in its molecular structure and hence is not preferable from the perspective of environmental load reduction.

Comparative Example 7

Example 6 was repeated except that the component (B) was changed into diethylcyclohexylamine (0.1 part by weight). The evaluation results are shown in Table 3. As compared to Example 6, the result was that transparency of the cured product and the yellowing resistance of the cured product were poor.

Comparative Example 8

Example 6 was repeated except that the component (B) was changed into diethylaminoethanol (0.5 part by weight). The evaluation results are shown in Table 3. As compared to Example 6, the results were that the usable time of the curable composition is short, and also transparency and the yellowing resistance of the cured product were poor.

TABLE 1

|  |  | Example 1 | Example 2 | Example 3 | Example 4 | Comparative Example 1 |
|---|---|---|---|---|---|---|
| Composition (parts by weight) | Component (A) | A1 (100) | A1 (100) | A1 (100) | A1 (100) | A1 (100) |
|  | Component (B) | B1 (0.05) | B1 (0.1) | B2 (0.1) | B3 (0.1) | B4 (0.1) |
|  | Component (C) | — | — | — | — | — |
| Viscosity change of composition solution (mPa·s) | Initial | 12 | 12 | 12 | 12 | 12 |
|  | After 6 hours | 15 | 17 | 16 | 14 | (solidified) |
| Refractive index of cured product (nd) |  | 1.71 | 1.71 | 1.71 | 1.71 | 1.71 |
| Tg of cured product (°C.) |  | 122 | 123 | 121 | 121 | 122 |
| Transparency of cured product |  | Transparent | Transparent | Transparent | Transparent | Transparent |
| Yellowness index (YI) | Initial | 3.1 | 3.4 | 3.3 | 3.4 | 3.7 |
|  | After heating | 57 | 55 | 55 | 56 | 71 |
|  | After exposure | 29 | 29 | 30 | 29 | 34 |
| Presence of halogen |  | No | No | No | No | Yes |

A1: bis(2,3-epithiopropyl)sulfide
B1: methyltri-n-butylphosphonium dimethylphosphate
B2: tetra-n-butylphosphonium di-n-butylphosphate
B3: tetra-n-butylphosphonium di-n-octylphosphate
B4: tetra-n-butylphosphonium bromide

TABLE 2

|  |  | Example 5 | Comparative Example 3 | Comparative Example 4 | Comparative Example 5 |
|---|---|---|---|---|---|
| Composition (parts by weight) | Component (A) | A1 (90) | A1 (90) | A1 (90) | A1 (90) |
|  | Component (B) | B1 (0.1) | B4 (0.1) | B5 (0.1) | B6 (0.1) |
|  | Component (C) | C1 (10) | C1 (10) | C1 (10) | C1 (10) |
| Viscosity change of composition solution (mPa·s) | Initial | 12 | 12 | 12 | 12 |
|  | After 6 hours | 16 | 80 | (Solidified) | 13 |
| Refractive index of cured product (nd) |  | 1.70 | 1.70 | 1.70 | 1.70 |
| Tg of cured product (°C.) |  | 102 | 104 | 107 | 95 |
| Transparency of cured product |  | Transparent | Transparent | Transparent | Slightly hazy |
| Yellowness index (YI) | Initial | 0.9 | 0.8 | 0.8 | 1.3 |
|  | After heating | 2.0 | 2.4 | 1.7 | 2.1 |
|  | After exposure | 2.9 | 3.1 | 2.2 | 3.2 |
| Presence of halogen |  | No | Yes | Yes | No |

A1: bis(2,3-epithiopropyl)sulfide
B1: methyltri-n-butylphosphonium dimethylphosphate
B4: tetra-n-butylphosphonium bromide
B5: tetra-n-butylammonium bromide
B6: diethylcyclohexylamine
C1: bis(2-mercaptoethyl)sulfide

TABLE 3

|  |  | Example 6 | Comparative Example 6 | Comparative Example 7 | Comparative Example 8 |
|---|---|---|---|---|---|
| Composition (parts by weight) | Component (A) | A1 (75) | A1 (75) | A1 (75) | A1 (75) |
|  | Component (B) | B1 (0.5) | B4 (0.1) | B6 (0.1) | B7 (0.5) |
|  | Component (C) | C2 (25) | C2 (25) | C2 (25) | C2 (25) |
| Viscosity change of composition solution (mPa·s) | Initial | 26 | 26 | 26 | 26 |
|  | After 6 hours | 31 | 31 | 31 | (Solidified) |
| Refractive index of cured product (nd) |  | 1.67 | 1.67 | 1.67 | 1.67 |
| Tg of cured product (°C.) |  | 69 | 71 | 68 | 70 |

TABLE 3-continued

| | | Example 6 | Comparative Example 6 | Comparative Example 7 | Comparative Example 8 |
|---|---|---|---|---|---|
| Transparency of cured product | | Transparent | Transparent | Strongly hazy | Slightly hazy |
| Yellowness index (YI) | Initial | 0.7 | 0.7 | 2.5 | 1.4 |
| | After heating | 1.4 | 1.4 | 2.8 | 1.7 |
| | After exposure | 1.5 | 1.8 | 3.4 | 2.0 |
| Presence of halogen | | No | Yes | No | No |

A1: bis(2,3-epithiopropyl)sulfide
B1: methyltri-n-butylphosphonium dimethylphosphate
B4: tetra-n-butylphosphonium bromide
B6: diethylcyclohexylamine
B7: diethylaminoethanol
C2: pentaerythritol tetrakis(3-mercaptopropionate)

The invention claimed is:

1. A curable composition comprising (A) an episulfide compound represented by the following general formula (2):

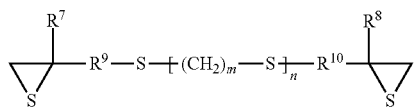

(2)

wherein n is an integer of 0 to 4, m is an integer of 0 to 6, $R^7$ and $R^8$ are each independently a hydrogen atom or a hydrocarbon group having 1 to 10 carbon atoms and $R^9$ and $R^{10}$ are each independently a hydrocarbon group having 1 to 10 carbon atoms; and (B) a polymerization catalyst comprising a tetraalkylphosphonium dialkylphosphate represented by the following general formula (1):

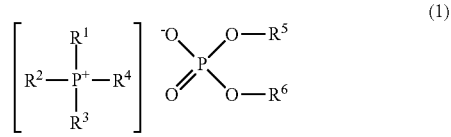

(1)

wherein $R^1$ to $R^6$ are the same or different, an alkyl group having 1 to 8 carbon atoms or an alkyl group having a hydroxyl group and 1 to 8 carbon atoms, and linear, branched or cycloaliphatic.

2. A curable composition according to claim 1, wherein the compound represented by the general formula (2) is bis(2,3-epithiopropyl)sulfide.

3. A curable composition according to claim 1, wherein (B) the tetraalkylphosphonium dialkylphosphate represented by the general formula (1) is tetra-n-butylphosphonium di-n-butylphosphate, methyltri-n-butylphosphonium dimethylphosphate or tetra-n-butylphosphonium di-n-octylphosphate.

4. A curable composition according to claim 1, characterized by further containing (C) a thiol compound.

5. A curing method characterized by heating a curable composition according to claim 1 to polymerize it.

6. A cured product obtained by heating a curable composition according to claim 1 to polymerize it.

* * * * *